United States Patent [19]

Keil

[11] 3,959,203

[45] May 25, 1976

[54] MODIFIED UNSATURATED POLYESTER COMPOSITIONS

[75] Inventor: Joseph W. Keil, Midland, Mich.

[73] Assignee: Dow Corning Corporation, Midland, Mich.

[22] Filed: Oct. 15, 1974

[21] Appl. No.: 514,689

[52] U.S. Cl. ............. 260/29.1 SB; 260/33.6 UA; 260/827
[51] Int. Cl.² .................... C08K 5/01; C08K 5/24
[58] Field of Search ............ 260/29.1 SB, 873, 827, 260/33.6 R, 33.6 UA

[56] References Cited
UNITED STATES PATENTS

| | | | |
|---|---|---|---|
| 2,890,188 | 6/1959 | Konkle et al. | 260/29.1 SB |
| 3,193,516 | 7/1965 | Broatch et al. | 260/29.1 SB |
| 3,511,788 | 5/1970 | Keil | 260/824 EP |
| 3,784,479 | 1/1974 | Keil | 252/358 |
| 3,843,577 | 10/1974 | Keil | 260/29.1 SB |
| 3,865,544 | 2/1975 | Keil | 252/358 |

*Primary Examiner*—Murray Tillman
*Assistant Examiner*—J. Ziegler
*Attorney, Agent, or Firm*—Jack E. Moermond

[57] ABSTRACT

Dispersions are disclosed which consist essentially of (A) an unsaturated polyester resin, (B) an additive for the resin which modifies the resin's properties which additive is selected from the group consisting of liquid organopolysiloxanes, siloxane copolymers composed of $SiO_2$ and $R_3SiO_{1/2}$ units, and liquid polyolefins, and (C) select silicone dispersing agents which keep (B) dispersed in (A).

15 Claims, No Drawings

MODIFIED UNSATURATED POLYESTER COMPOSITIONS

Unsaturated polyester resins are well known materials and much has been written about them in the technical literature. Probably the most commonly used unsaturated polyester resins today are produced by the condensation of an unsaturated dicarboxylic acid, such as maleic or fumaric acid, with a glycol or mixture of glycols, such as ethylene glycol, propylene glycol, diethylene glycol, dipropylene glycol, bisphenol A or butylene glycol.

Saturated acids, for example, phthalic, sebacic or adipic acids, are sometimes included in the composition to reduce the amount of unsaturation in the final product, making it tougher and more flexible.

There is usually added to the unsaturated polyester resin a vinyl monomer. The vinylic monomer serves as a solvent or diluent for the unsaturated polyester and as a co-monomer therefor. These vinylic monomers are generally referred to as cross-linking agents for the unsaturated polyesters but sometimes are also called diluents. Those vinylic monomers which tend to copolymerize rather than homopolymerize are by far the best. Styrene and diallyl phthalate are probably the leading materials used for this purpose. Illustrative of the other vinyl monomers which can be used are alpha-methyl styrene, vinyl toluene, phenyl alpha-methyl styrene ketone, divinyl benzene, vinyl acetate, vinyl 2-chloro-ethyl ether, N-vinyl pyrrolidone, 2-vinyl pyridine, chlorostyrene, methyl methacrylate and triallyl cyanurate.

The term "unsaturated polyester resin" as used herein is intended to include not only the resin per se but also the combination of the resin with a solvent or diluent as they are commonly marketed.

The polymerization of the unsaturated polyester to obtain the final product is carried out with the aid of an initiator which can be, for example, benzoyl peroxide, 2,4-dichlorobenzoyl peroxide, methyl ethyl ketone peroxide, cyclohexanone peroxide or cumene peroxide.

In addition one can employ catalysts or inhibitors in the unsaturated polyesters to control the rate of polymerization. Cobalt naphthenate acts as an accelerator for the hydroperoxides and dimethylaniline for the peroxides. Hydroquinone is illustrative of the inhibitors which can be used to prevent premature cross-linking, and to improve the shelf-life of the uncatalyzed polyester resin.

The polyester resins can also be cured by other techniques such as radiation curing, microwave heating, radio frequency heating, or any other method which generates free radicals.

The properties of unsaturated polyester resin products can be varied by several techniques. For example, fillers can be added to improve the strength and/or reduce the cost. Examples of reinforcing fillers include fibrous materials such as glass, quartz, cotton, asbestos, ramie, sisal and alpha-cellulose. Bulk fillers used primarily to reduce cost and improve handling properties are illustrated by clays, ground shell flours, perlite, silicates, carbonates, silicas, aluminas and titanias. Another means of modifying unsaturated polyester resin products is to incorporate long-chain monocarboxylic acids into the formulation which increases the elasticity of the polyester chain. The foregoing serves only to illustrate a couple of the ways polyesters can be modified which are well known to those skilled in the art. For those desiring more detailed information about unsaturated polyester resins attention is directed to the books "Unsaturated Polyesters: Structure and Properties" by Herman V. Boeing, Elsevier Publishing Co., Amsterdam 1964, and "Polyesters and Their Applications" by Bjorksten Research Laboratories, Inc., Reinhold Publishing Corp. 1956.

It would be desirable to improve various properties of unsaturated polyester resins by the incorporation of additives therein. For example, it would be beneficial if the water repellent, self-lubricating, dielectric, impact resistance and/or wet electrical properties could be improved. However, many of the additives which could be incorporated into the unsaturated polyesters to improve their properties are not per se soluble or dispersible in the polyesters nor can they be uniformly dispersed therein employing readily available dispersing agents.

By way of illustration the additives useful herein include liquid organopolysiloxanes, siloxanes consisting essentially of $SiO_2$ units and $R_3SiO_{1/2}$ units, and liquid polyolefins.

The liquid organopolysiloxanes have as their primary structural unit the $R'_2SiO$ moiety wherein $R'$ represents a hydrocarbon or halogenated hydrocarbon radical containing from 1 to 18 carbon atoms. Specific examples of $R'$ include the alkyl radicals such as the methyl, ethyl, propyl, isopropyl, butyl, hexyl, octyl, 2-ethylhexyl, dodecyl and octadecyl radicals; alkenyl radicals such as the vinyl, allyl, hexenyl, dodecenyl and octadecenyl radicals; alkynyl radicals such as the ethynyl and hexynyl radicals; aryl radicals such as the phenyl, biphenylyl and naphthyl radicals; alkaryl radicals such as the tolyl, xylyl, mesityl and ethylphenyl radicals; aralkyl radicals such as the benzyl and 2-phenylethyl radicals; cycloaliphatic radicals such as the cyclobutyl, cyclohexyl and cyclohexenyl radicals; and the corresponding halogenated radicals such as the chloropropyl, 3,3,3-trifluoropropyl, bromobutyl, dichlorohexyl, dichlorophenyl, bromobenzyl and the alpha,alpha, alpha-trifluorotolyl radicals. These liquid organopolysiloxanes can also contain minor amounts, generally less than ten mole percent, of siloxane units of the formulae $R'SiO_{3/2}$, $R'_3SiO_{1/2}$ and $SiO_{1/2}$ wherein $R'$ is as defined above. These liquid organopolysiloxanes can have viscosities at 25°C. ranging from 0.65 to 1,000,000 centistokes with a preferred range being from 50 to 200,000 centistokes.

The siloxanes composed of $SiO_2$ and $R_3SiO_{1/2}$ units are resinous materials. The R radical can be any hydrocarbon radical containing from 1 to 6 carbon atoms. Thus R can be an aliphatic radical such as the methyl, ethyl, propyl, butyl, isobutyl, pentyl, hexyl, vinyl, allyl, butenyl and hexenyl radicals; a cycloaliphatic radical such as the cyclohexyl and cyclohexenyl radicals; or R can be a phenyl radical. So far as is known at this time, these resinous siloxanes useful in this invention are those in which the ratio of the $SiO_2$ units to the $R_3SiO_{1/2}$ units is in the range of 1:0.4 to 1:1.2. These resinous siloxanes can contain minor amounts of $R_2SiO$ and $RSiO_{3/2}$ siloxane units wherein R is as defined above.

Examples of the liquid polyolefins useful herein are butadiene, polybutene and styrene-butadiene copolymers.

It has been found in accordance with this invention that when one of the select silicone dispersing agents described below is used, it is possible to form dispersions of the above described additives in unsaturated polyester resins and thereby enhance the properties of the products made from the polyester resins.

One silicone dispersing agent useful herein is a siloxane copolymer consisting essentially of $SiO_2$ units, $(CH_3)_3SiO_{1/2}$ units and $D(CH_3)_2SiO_{1/2}$ units in which D is a polyoxyethylene polymer having a molecular weight of at least 2000 or a polyoxyethylene-polyoxypropylene copolymer having a molecular weight of at least 2500 and the polyoxypropylene portion constitutes up to 50 mole percent of the copolymer said D being attached to the silicon atom via a silicon-carbon bond, and the ratio of the $SiO_2$ units to the total $(CH_3)_3SiO_{1/2}$ and $D(CH_3)_2SiO_{1/2}$ units is in the range of 1:0.4 to 1:1.2. Test results to date indicate that when the molecular weight of the polyoxyalkylene portion D falls below that specified above the additive cannot be properly dispersed in the unsaturated polyester resin. Test results thus far have also indicated that when D is polyoxypropylene the additive cannot be properly dispersed.

A second silicone dispersing agent useful herein is a siloxane copolymer reaction product derived from heating a mixture of a siloxane consisting essentially of $SiO_2$ units and $(CH_3)_3SiO_{1/2}$ units in which the ratio of the $SiO_2$ units to $(CH_3)_3SiO_{1/2}$ units is in the range of 1:0.4 to 1:1.2, and a hydroxylated polyoxyethylene polymer having a molecular weight of at least 2000 or a hydroxylated polyoxyethylene-polyoxypropylene copolymer having a molecular weight of at least 2,500 and the polyoxypropylene portion constitutes up to 50 mole percent of the copolymer. It is believed that these dispersing agents differ from those described immediately above only in that the polyoxyalkylene portion is attached to the silicon atom via a silicone to oxygen to carbon bond instead of a direct silicon to carbon bond. It is theorized that the reaction upon heating takes place between residual silanol known to exist in the siloxane and the hydroxyl groups in the polyoxyalkylene. Formation of the reaction product is facilitated by the use of a catalyst known to promote the silanol-carbinol condensation reaction, examples of such catalysts being bases such as potassium hydroxide and metal salts such as stannous octoate. As noted above, test results indicate the molecular weight limitations to be critical.

The third silicone dispersing agent useful in this invention is a polydimethylsiloxane-organic copolymer in which the polydimethylsiloxane portion has a molecular weight of at least 2000 and the organic portion consists essentially of a polyoxyethylene polymer having a molecular weight of at least 800 or a polyoxyethylene-polyoxypropylene copolymer having a molecular weight of at least 1500 and the polyoxypropylene portion constitutes no more than 50 mole percent of organic portion of the copolymer, said organic portion being attached to silicon atoms via silicon-carbon bonds.

The final silicone dispersing agent useful herein is a siloxane-organic copolymer which is the reaction product produced by heating a mixture of a hydroxylated polydimethylsiloxane having a molecular weight of at least 1500 and a hydroxylated polyoxyethylene having a molecular weight of at least 800 or a hydroxylated polyoxyethylene-polyoxypropylene copolymer having a molecular weight of at least 1,500 and the polyoxypropylene constitutes up to 50 mole percent of the organic portion of the copolymer.

The comments with regard to the criticality of the molecular weight limitations and preparation techniques set forth with regard to the first two dispersing agents above is believed equally applicable to the last two respective dispersing agents of this invention. It should perhaps be noted at this point that while the dispersing agents of this invention are believed to be novel per se, analogous polymers are well known in the field of silicone chemistry as well as the means for preparing such polymers and hence no such details are given here as they are well known to the artisan.

So far as is known at this time there is no critical order of mixing the three essential components of the composition of this invention, namely, the unsaturated polyester resin, the additive and the silicone dispersing agent. However, once the three ingredients are brought together a thorough mixing must take place in order that a uniform dispersion of the additive in the unsaturated polyester resin with the aid of the silicone dispersing agent is achieved. Marketing and manufacturing procedures indicate that the best method for preparing the compositions is to first prepare a mixture of the additive and silicone dispersing agent which mixture can be stored for addition at some future date to the unsaturated polyester resin during the appropriate phase of manufacture.

In the final composition the unsaturated polyester resin should constitute from 50 to 99.45 percent by weight, preferably 65 to 85 percent; the additive should constitute 0.5 to 40 percent by weight, preferably 1 to 10 percent; and the silicone dispersing agent should constitute from 0.05 to 10 percent by weight, preferably 0.5 to 5 percent.

Once the composition of this invention has been formed it can be processed or used to manufacture articles in any of the known ways employed for unsaturated polyester resins heretofore.

Now in order that those skilled in the art may better understand how the present invention can be practiced, the following examples are given by way of illustration and not by way of limitation. All parts and percents referred to herein are by weight and all viscosities measured at 25°C. unless otherwise specified.

EXAMPLE 1

Seven dispersions were prepared which consisted essentially of 4 lbs. (about 96.5%) of (A) an unsaturated polyester resin, 50 ml. (about 2.7%) of (B) a liquid trimethylsilyl endblocked polydimethylsiloxane or a mixture of a liquid trimethylsilyl endblocked polydimethylsiloxane and a siloxane resin copolymer composed of $SiO_2$ and $(CH_3)_3SiO_{1/2}$ units in which the ratio of $SiO_2$ units to $(CH_3)_3SiO_{1/2}$ units was in the range of 1:0.4 to 1:1.2, and 15 ml. (about 0.8%) of (C) a dispersing agent which is a copolymer derived by heating a mixture of 1 part of a siloxane consisting essentially of $SiO_2$ and $(CH_3)_3SiO_{1/2}$ units in which the ratio of $SiO_2$ units to $(CH_3)_3SiO_{1/2}$ units is in the range of 1:0.4 to 1:1.2 and 3 parts of a hydroxylated polyoxypropylene-polyoxyethylene copolymer (about a 1:1 mole ratio) having a molecular weight of about 6280, in the presence of potassium hydroxide. These compositions were prepared by thoroughly mixing the ingredients until a uniform dispersion was obtained. In compositions 1–3 the unsaturated polyester resin (A) was a high quality isophthalic based resin of the type used in making molds, while in compositions 4–7 a regular commercial isophthalate based unsaturated polyester (A) resin (Ferro Gel Coat) was employed. In compositions 1 and 4, (B) was a mixture of 90% the polydimethylsiloxane having a viscosity of 10,000 cs. and 10% of the siloxane resin copolymer; in compositions 2 and 5, (B) was 100% of the polydimethylsiloxane having a viscosity of 10,000 cs.; in compositions 3 and 7, (B) was 100% of the polydimethylsiloxane having a viscosity of 1000 cs.; and in composition 6, (B) was 100% of the polydimethylsiloxane having a viscosity of 30,000 cs.

After preparation the dispersions were sprayed on glass panels, waxed and unwaxed, for evaluation. The compositions were cured by spraying them with a 60% solution of methylethylketone in dimethyl phthalate and then allowing them to stand at room temperature. All the cured compositions released from the waxed and unwaxed glass panels as good as unsaturated polyester resin boat panels. Composition 5 released most easily and had the highest gloss. Compositions 6 and 4 ranked second and third, respectively.

EXAMPLE 2

Six unsaturated polyester castings were prepared. Composition 1 consisted of (A) 80 parts (76.9%) of an isophthalic based unsaturated polyester resin containing about 35% styrene monomer, having a viscosity in the range of 21-27 poises, and a specific gravity of about 1.13 (American Cyanamid PDL-7-989), (B) 20 parts (19.2%) of a trimethylsilyl endblocked polydimethylsiloxane having a viscosity of 30,000 cs., (C) 4 parts (3.9%) of a dispersing agent which was identical to that used in Example 1 except that stannous octoate was used in the preparation, plus 0.8 part of a 60% solution of benzoyl peroxide in a phthalate plasticizer, and 4 drops of dimethylaniline.

Composition 2 was identical to composition 1 except that the dispersing agent (C) was prepared from a polyoxyalkylene copolymer composed of about 75% polyoxyethylene and about 25% polyoxypropylene, said copolymer having a molecular weight of about 13,900 and a viscosity of about 90,000 SUS at 100°F. (Ucon 75 H 90,000).

Composition 3 was identical to composition 1 except that (B) had a viscosity of 1000 cs.

Composition 4 was identical to composition 1 except that (A) was a highly reactive unsaturated polyester resin containing about 40% vinyl toluene monomer, having a viscosity in the range of 13-17 poises, and a specific gravity of 1.05-1.08 (Koppers V-7000-15).

Composition 5 was identical to composition 1 except that 87% of (A), 10.8% of 1000 cs. (B), and 2.2% of (C) were used.

Composition 6 was identical to composition 1 except that 87% of (A), 10.8% of (B), and 2.2% of (C) was used.

The compositions were prepared by thoroughly mixing (A), (B) and (C), then adding and mixing in the peroxide, and finally adding and mixing in the dimethylaniline. The composition was then deaired. Compositions 1–4 were allowed to stand for 65 hours at ambient conditions, then cured 2 hours at 70°C. followed by ½ hour at 100°C. Compositions 5 and 6 were cured in the same way except that they only stood overnight at ambient conditions.

These compositions were evaluated on the LFW-6 thrust washer testing machine which is now known as the Falex Thrust Washer Test Machine Model No. 6. This machine provides a method for the measurement of wear rate and static and kinetic coefficients of friction for unlubricated polymers in rubbing contact via the testing machine which utilizes a thrust washer specimen configuration. In this example the machine was operated with the polymer wafer rotating under load against a stationary steel mating surface. The tests were conducted at a rotating speed of 50 feet per minute and/or 100 feet per minute. The PV (pressure-velocity) Limit and sometimes wear rates were determined by this method. The PV Limit was determined by starting with a one pound load on the 10:1 lever arm, running the sample for one hour and then increasing the weight until failure occured. The weight was generally increased at the rate of 1 pound per hour until a 6 pound load was achieved and then increased at the rate of two pounds per hour until failure. Failure is deemed to occur when there is a continuous increase in temperature; there is excessive squeeling; or there is a non-stable coefficient or friction (continuous increase in torque). No correlation has been established to date between results obtained via this test method and results obtained under actual service conditions. If the test conditions are changed, the wear rates will change and the relative value of one polymer with respect to another may also change. Results of the evaluations are set forth in the table below.

| Composition | PV Limit 50 ft/min | Wear $\times$ 10$^3$ 15M PV | PV Limit 100 ft/min | Wear $\times$ 10$^3$ 15M PV |
| --- | --- | --- | --- | --- |
| 1 | >50,400 | 23 | 67,400 | — |
| 2 | 33,600 | 71 | — | — |
| 3 | 50,400 | — | 57,400 | very little |
| 4 | 24,000 | high | — | — |
| 5 | 4,800 | — | 72,000 | — |
| 6 | 4,800 | — | 52,800 | — |

A polyester casting made from composition 1 above was run on the LFW-6 machine at various PV levels below the failure limit to measure the wear characteristics. Three, 6 and 9 pound loads on the lever arm were used to achieve the PV levels. These tests were run at a rotating speed of 100 feet per minute. For comparison, another polyester casting was made from a composition identical to composition 1 except that the fluid (B) and the dispersing agent (C) was omitted. This casting at both 50 and 100 feet per minute failed due to squeeling of the sample, and only one pound could be placed on the lever arm due to the excessive noise generated. Test results are set forth in the table below.

| PV | PSI | Wear (in./hr.) | Coefficient of Friction |
| --- | --- | --- | --- |
| 14,400 | 144 | <0.02 $\times$ 10$^{-3}$ | 0.045 |
| 28,800 | 288 | 0.08 $\times$ 10$^{-3}$ | 0.085 |
| 43,200 | 432 | 0.12 $\times$ 10$^{-3}$ | 0.038 |
| 2,400* | 48 | 2.8 $\times$ 10$^{-3}$ | 0.30 |
| <4,800* | 48 | ** | Not Measurable |

*For comparison
**Squeeled so much could not continue run to measure

EXAMPLE 3

Three dispersing agents were prepared by heating at reflux a xylene solution of a siloxane copolymer composed of $SiO_2$ and $(CH_3)_3SiO_{1/2}$ units in which the ratio of $SiO_2$ units to $(CH_3)_3SiO_{1/2}$ units is in the range of 1:0.4 to 1:1.2 and a polyoxyalkylene copolymer composed of about 75% polyoxyethylene and about 25% polyoxypropylene, said copolymer having a molecular weight of about 13,900 and a viscosity of about 90,000 SUS at 100°F. (Ucon 75 H 90,000) in the presence of stannous octoate (Nuocure 28).

Dispersing agent (a) was prepared by refluxing 138.5g. of a xylene solution of the siloxane resin (72.2% solids), 300g. of the polyoxyalkylene, 359.5g. of xylene, and 2g. of the stannous octoate. The ratio of the siloxane to polyoxyalkylene in this dispersing agent was 1/3.

Dispersing agent (b) was prepared by refluxing 41.38g. of a xylene solution of the siloxane resin (75.7% solids), 31.25g. of the polyoxyalkylene, 114.35g. of xylene, and 0.63g. of the stannous octoate. The ratio of the siloxane to polyoxyalkylene in this dispersing agent was 1/1.

Dispersing agent (c) was prepared by refluxing 29.06g. of a xylene solution of the siloxane resin (75.7% solids), 44g. of the polyoxyalkylene, 126.44g. of xylene, and 0.50g. of the stannous octoate. The ratio of the siloxane to polyoxyalkylene in this dispersing agent was 1/2.

Six solutions were prepared by mixing 1 or 2 parts of the above dispersing agents with 10 parts of a trimethylsilyl endlblocked polydimethylsiloxane fluid having a viscosity of 1000 cs. Solution (a') contained 1 part dispersing agent (a) and 10 parts of the fluid. Solution (b') contained 1 part dispersing agent (b) and 10 parts of the fluid. Solution (c') contained 1 part dispersing agent (c) and 10 parts of the fluid. Solution (a'') contained 2 parts dispersing agent (a) and 10 parts of the fluid. Solution (b'') contained 2 parts dispersing agent (b) and 10 parts of the fluid. Solution (c'') contained 2 parts dispersing agent (c) and 10 parts of the fluid.

Six dispersions were prepared which each consisted essentially of about 97% of a commercial isophthalate based unsaturated polyester resin (Ferro Gel Coat), and about 3% of one of the above solutions. Thus dispersions 1, 2 and 3 consisted essentially of (A) about 97% unsaturated polyester resin, (B) about 2.7% of the polydimethylsiloxane fluid, and (C) about 0.3% of dispersing agents (a), (b) and (c), respectively. Dispersions 4, 5 and 6 consisted essentially of (A) about 97% unsaturated polyester resin, (B) about 2.5% of the polydimethylsiloxane fluid, and (C) about 0.5% of dispersing agents (a), (b) and (c), respectively. A seventh dispersion was prepared which consisted essentially of (A) about 97% of the unsaturated polyester resin, (B) about 2.93% of the polydimethylsiloxane fluid, and (C) about 0.07% of dispersing agent (b). An eighth dispersion was prepared which consisted essentially of (A) about 97% of the unsaturated polyester resin, (B) about 2.7% of the polydimethylsiloxane fluid, and (C) about 0.3% of the dispersing agent of Example 2, Composition 1. These dispersions were examined for particle size and dispersion stability, the results being set forth in the following table.

| Dispersion | Particle Size (microns) | Stability after 15 days |
|---|---|---|
| 1 | 1–3 | Very good |
| 2 | 1–3 | Good |
| 3 | 1–3 | Good |
| 4 | 0.5–1 | Very good |
| 5 | 0.5–1 | Very good |
| 6 | 0.5–1 | Very good |
| 7 | 1–3 | Slight cream up |

-continued

| Dispersion | Particle Size (microns) | Stability after 15 days |
|---|---|---|
| 8 | 2–4 | Creamed up in 5 days |

EXAMPLE 4

A molding compound was prepared by thoroughly mixing 200g. of a highly reactive unsaturated polyester resin containing vinyl toluene monomer, having a viscosity in the range of 8–12 poises, and a specific gravity of 1.12–1.15 (Koppers V-7001-10), 5.6g. of the dispersing agent of Example 1, 22g. of a trimethylsilyl endblocked polydimethylsiloxane fluid having a viscosity of about 1000 cs., 550g. of alumina filler (Alcoa C-333), 55g. of clay filler having a surface area of about 400 m²/g (ASP-400 clay), and 2g. of tertiary butyl peroxide. This compound was cured for 3 minutes at 300°F. (149°C.). The surface of the cured compound was smooth and shiney.

EXAMPLE 5

A dispersing agent was prepared by refluxing for 3.5 hours under a nitrogen blanket a mixture of 25g. of resin solids composed of $SiO_2$ and $(CH_3)_3SiO_{1/2}$ units, the ratio of the $SiO_2$ to $(CH_3)_3SiO_{1/2}$ units being in the range of 1:0.4 to 1:1.2; 75g. of a polyoxyalkylene copolymer compound of about 75% polyoxyethylene and about 25% polyoxypropylene, said copolymer having a molecular weight of about 13,900 and a viscosity of about 90,000 SUS at 100°F. (Ucon 75 H 90,000); 100g. of xylene; and 9 drops of 1N alcoholic KOH.

Two dispersions were prepared by mixing in a glass plate with micro-spatula the ingredients set forth below. Dispersion A consisted essentially of 0.7g. of a highly reactive unsaturated polyester resin containing about 40% vinyl toluene monomer, having a viscosity in the range of 13–17 poises, and a specific gravity of 1.05–1.08 (Koppers V-7000-15), and 0.3g. of a liquid polybutadiene homopolymer having a molecular weight of about 5000 (Arco Poly BD R-15M). Dispersion B consisted essentially of 0.7g. of the unsaturated polyester resin used in dispersion A, 0.25g. of the polybutadiene used in dispersion A, and 0.05g. of the above prepared dispersing agent.

The above prepared dispersions were aged at room temperature. Dispersion A was clear at first but separated into two layers. Dispersion B was cloudy but did not separate at room temperature or at 100°C. Dispersion B was cured at 100°C. to a uniform, cloudy resin.

EXAMPLE 6

A dispersion was prepared which consisted essentially of 0.7g. of a highly reactive unsaturated polyester resin containing vinyl toluene monomer, having a viscosity in the range of 8–12 poises, and a specific gravity of 1.12–1.15 (Koppers V-7001-10); 0.3g. of a trimethylsilyl endblocked polydimethylsiloxane fluid having a viscosity of about 1000 cs.; and 0.05g. of a dispersing agent prepared by refluxing for 30 minutes under nitrogen a mixture of 25g. of a trimethylsilyl endblocked copolymer compound of about 91.4 mole percent polydimethylsiloxane units, about 8.6 mole percent polymethylhydrogensiloxane units and having a molecular weight of about 5160; 100g. of an allyl capped polyoxyalkylene copolymer composed of polyoxyethylene and polyoxypropylene units (about 1:1 mole ratio) said copolymer having a molecular weight of about 6000; 125g. of xylene; and 20 drops of 1M $H_2PtCl_6 \cdot 6H_2O$ in isopropanol.

The above prepared dispersion was stable for 2 hours at 100°C. at which time the resin began to cure. An identical dispersion except that it does not contain the dispersing agent of this invention separates in less than 5 minutes at 100°C.

EXAMPLE 7

When liquid polybutene or a liquid styrenebutadiene copolymer is substituted for the liquid polybutadiene of the preceding example, similar results are obtained.

That which is claimed is:

1. A dispersion consisting essentially of
   A. from 50 to 99.45 percent by weight of an unsaturated polyester resin,
   B. from 0.5 to 40 percent by weight of a material selected from the group consisting of liquid organopolysiloxanes, siloxane copolymers composed of $SiO_2$ and $R_3SiO_{1/2}$ units wherein R is a hydrocarbon radical containing from 1 to 6 carbon atoms and the ratio of $SiO_2$ units to $R_3SiO_{1/2}$ units is in the range of 1:0.4 to 1:1.2, and liquid polyolefins, and
   C. from 0.05 to 10 percent by weight of a dispersing agent which maintains (B) dispersed in (A), said dispersing agent being a siloxane copolymer selected from the group consisting of
      1. copolymers consisting essentially of $SiO_2$ units, $(CH_3)_3SiO_{1/2}$ units and $D(CH_3)_2SiO_{1/2}$ in which D is a polyoxyethylene polymer having a molecular weight of at least 2000, or a polyoxyethylene-polyoxypropylene copolymer having a molecular weight of at least 2500 and the polyoxypropylene portion constitutes up to 50 mole percent of the organic portion of the copolymer, said D being attached to the silicon atom via a silicon-carbon bond, the ratio of the $SiO_2$ units to the total $(CH_3)_3SiO_{1/2}$ and $D(CH_3)_2SiO_{1/2}$ units being in the range of 1:0.4 to 1:1.2,
      2. copolymers which are reaction products derived from heating a mixture of a siloxane consisting essentially of $SiO_2$ units and $(CH_3)_3SiO_{1/2}$ units in which the ratio of $SiO_2$ units to $(CH_3)_3SiO_{1/2}$ units is in the range of 1:0.4 to 1:1.2, and a hydroxylated polyoxyethylene polymer having a molecular weight of at least 2000 or a hydroxylated polyoxyethylene-polyoxypropylene copolymer having a molecular weight of at least 2500 and the polyoxypropylene constitutes up to 50 mole percent of the organic portion of the copolymer,
      3. polydimethylsiloxane-organic copolymers in which the polydimethylsiloxane portion has a molecular weight of at least 2000 and the organic portion consists essentially of a polyoxyethylene polymer having a molecular weight of at least 800, or a polyoxyethylenepolyoxypropylene copolymer having a molecular weight of at least 1500 and the polyoxypropylene constitutes up to 50 mole percent of the organic portion of the copolymer said organic portion being attached to silicon atoms via silicon-carbon bonds, and
      4. polydimethylsiloxane-organic copolymers which are reaction products produced by heating a mixture of hyroxylated polydimethylsiloxanes having a molecular weight of at least 1500, and a hydroxylated polyoxyethylene polymer having a molecular weight of at least 800, or a hydroxylated polyoxyethylene-polyoxypropylene copolymer having a molecular weight of at least 1500 and the polyoxypropylene constitutes up to 50 mole percent of the organic portion of the copolymer.

2. A dispersion as defined in claim 1 wherein (A) is from 65 to 85 percent, (B) is from 1 to 10 percent, and (C) is from 0.5 to 5 percent.

3. A dispersion as defined in claim 2 wherein (B) is a liquid organopolysiloxane.

4. A dispersion as defined in claim 3 wherein (B) is a trimethylsilyl endblocked polydimethylsiloxane and (C) is copolymer (2).

5. A dispersion as defined in claim 3 wherein (B) is a trimethylsilyl endblocked polydimethylsiloxane and (C) is copolymer (3).

6. A dispersion as defined in claim 3 wherein (B) is a trimethylsilyl endblocked polydimethylsiloxane and (C) is copolymer (4).

7. A dispersion as defined in claim 2 wherein (B) is a mixture of a liquid organopolysiloxane and a siloxane copolymer composed of $SiO_2$ and $R_3SiO_{1/2}$ units wherein R is a hydrocarbon radical containing from 1 to 6 carbon atoms and the ratio of $SiO_2$ units to $R_3SiO_{1/2}$ units is in the range of 1:0.4 to 1:1.2.

8. A dispersion as defined in claim 7 wherein in (B) the liquid organopolysiloxane is a trimethylsilyl endblocked polydimethylsiloxane and each R is a methyl radical.

9. A dispersion as defined in claim 2 which also contains a filler.

10. A dispersion as defined in claim 2 wherein (B) is a liquid polyolefin.

11. A dispersion as defined in claim 10 wherein (B) is polybutadiene and (C) is copolymer (2).

12. A dispersion as defined in claim 10 wherein (B) is polybutadiene and (C) is copolymer (3).

13. A dispersion as defined in claim 10 wherein (B) is polybutadiene and (C) is copolymer (4).

14. A dispersion as defined in claim 10 wherein (B) is polybutene.

15. A dispersion as defined in claim 10 wherein (B) is a styrene-butadiene copolymer.

* * * * *